United States Patent [19]

Giammarco et al.

[11] 4,198,378
[45] Apr. 15, 1980

[54] PROCESS FOR REMOVING $CO_2$, $H_2S$ AND OTHER GASEOUS IMPURITIES FROM GASEOUS MIXTURES

[76] Inventors: Giuseppe Giammarco; Paolo Giammarco, both of San Marco 3242, Palazzo Morolin, Venice, Italy

[21] Appl. No.: 847,885

[22] Filed: Nov. 2, 1977

[30] Foreign Application Priority Data

Nov. 12, 1976 [IT] Italy .............................. 69710 A/76
Feb. 3, 1977 [IT] Italy .............................. 67229 A/77

[51] Int. Cl.² .......................................... B01D 53/34
[52] U.S. Cl. ................................... 423/220; 423/223; 423/226; 423/228; 423/229; 423/232; 423/233
[58] Field of Search ............... 423/220, 221, 223, 226, 423/228, 229, 232, 233; 203/96, DIG. 8, DIG. 10, DIG. 11; 48/197 R; 122/1 R, 5, 16

[56] References Cited

FOREIGN PATENT DOCUMENTS

728738 4/1955 United Kingdom ..................... 423/232

Primary Examiner—Earl C. Thomas
Attorney, Agent, or Firm—Sughrue, Rothwell, Mion, Zinn and Macpeak

[57] ABSTRACT

A process for removing gaseous impurities such as $CO_2$ and/or $H_2S$ from a gaseous mixture obtained by reacting combustible substances with steam, said steam being produced in boilers fed with water previously purified in degassing columns. The gaseous impurities are removed by means of an absorbent solution and the latter is regenerated in a regeneration column by stripping with steam. The stripping steam necessary for the degassing is delivered, at a pressure at least equal to that in the regeneration column, to the degassing columns and then to the regeneration column. The boiler feed water to be purified is previously heated, by supply of residual heats, to a temperature in the vicinity of the boiling temperature of the absorbent solution in the regeneration column.

29 Claims, 8 Drawing Figures

PROCESS FOR REMOVING CO₂, H₂S AND OTHER GASEOUS IMPURITIES FROM GASEOUS MIXTURES

The present invention relates to a process for the removal of gaseous impurities contained in a gaseous mixture, and especially to a process for the removal of $CO_2$ and/or $H_2S$ and/or similar impurities, in installations in which boilers for producing steam and apparatus for heat degassing and purification of the boiler feed water are also used, and in which the condensation waters obtained in said installations are purified for ecological purposes.

As is known, the removal of $CO_2$, $H_2S$ and the like is effected by using absorbent solutions of suitable chemical nature, such as solutions of ethanolamine (MEA, DEA, and the like) with possible addition of corrosion inhibitors, solutions of alkali metal carbonates, either alone or activated by addition of $As_2O_3$, glycine or other aminoacids, or else activated by addition of ethanolamine or of boric acid, selenium, tellurium and the like. It is also known that the removal of $H_2S$ can be also effected by using solutions of tripotassium phosphate, or else solutions commercialized under the trademarks SULFINOL, ALKAZID and the like. The above-mentioned process for the removal of impurities is constituted by a cycle including an absorption step and a regeneration step; in this latter the absorbent solution is regenerated at elevated temperature by means of externally supplied heat. This heat is at least in part supplied by the gaseous mixture to be purified (process gas); the said heat is given up to the solution by passing the gaseous mixture through the so-called "reboiler", located at the bottom of the regeneration column, as is known in the art.

Moreover, it is known that the abovementioned process is used in installations for the production of hydrogen, $NH_3$, methanol, as well as for hydrogenation, oxo synthesis and the like, in which are also utilized reforming installations, partial combustion installations or other installations for gasification, and finally installations for conversion of CO. The abovementioned installations consume notable quantities of steam produced by suitable boilers, connected, as mentioned above, with apparatus for degassing and purifying the boiled feed water.

Finally, it is known that the boiler feed waters are generally submitted to a preliminary chemical treatment and then to a treatment with steam in a degassing apparatus to remove the $CO_2$ and $O_2$ present in said waters; the said steam is then in greatest part condensed in the column used for heating the water, thus utilizing a large amount of the steam as heat of integration which is carried forward to the boiler.

It is also known that the condensation waters of the apparatus for the removal of $CO_2$ and/or $H_2S$, especially the condensate obtained from the reboiler and the like and also part of the condensation waters of the coolers for $CO_2$ and/or $H_2S$, are separately treated to remove the impurities such as $NH_3$, methanol, amines, $CO_2$ and the like, since the discharge of said impurities to the outside would lead to considerable ecological problems, and are generally combined with the waters coming from the chemical treatment, and the whole is sent to the degassing apparatus for the subsequent removal of $CO_2$ and $O_2$, as mentioned above.

The object of the present invention is that of sharply reducing the consumption of heat in the process for the removal of $CO_2$ and/or $H_2S$, and also the heat supplied to the apparatus for degassing and purifying the boiler feed waters and the heat required for the ecological purification of the waters discharged to the outside.

This object is achieved by arranging, with respect to the gaseous circuit, the apparatus for the purification of the boiler feed waters in series and also in series with the regeneration column of the apparatus for removing $CO_2$ and/or $H_2S$, and by delivering the steam required for the purification of the waters, to the first device (or column) of the series, subsequently to the others and finally to the regeneration column for $CO_2$ and/or $H_2S$; the steam is therefore used several times. The decrease in heat consumption is also obtained by pre-heating the aforesaid boiler feed waters to a temperature in the vicinity of the boiling temperature of the absorbent solution at the pressure of the regeneration column of the apparatus for removing $CO_2$ and/or $H_2S$, by means of the residual heats of said apparatus.

The said residual heats, obtained at low temperature and which are no longer utilizable for the regeneration, replace the steam for heating the waters during their degassing and purification, thereby rendering said steam available. The latter is delivered, thanks to its higher temperature, to the regeneration column and used therein. This stems from the fact that the steam delivered in amounts required for the stripping of the impurities is no longer consumed for heating the waters and is thus recovered in thermal excess at the top of the degassing and purifying columns. The said steam is extracted from the latter and delivered to the regeneration column of the apparatus for removing $CO_2$ and/or $H_2S$ where it is used another time.

The recovery and the re-use of the aforesaid residual heats permit the heat comsumption of the process for removing $CO_2$ and/or $H_2S$ to be reduced by about 200–230 KCal/m³ of $CO_2$ (with reference to a 2-stage apparatus, 28 Atm., with a solution activated with glycine). A further and more important decrease in heat consumption is obtained by utilizing several times in series the same amount of heat, especially when, in addition to the degassing and purification of the boiler feed waters, the present invention is also applied to the ecological purification of the waters discharged to the outside.

The decrease in heat consumption ranges in this case from 250 to 350 KCal/cu.m. of $CO_2$ and/or $H_2S$.

It is important here to indicate the concepts and considerations which are the basis of the present invention, and the prescriptions which are necessary or advantageous for its practicizing:

(a) in the first place it has been ascertained, contrary to the usual opinion, that it was not necessary to make a new outlay for the thermal apparatus for the recovery and utilization of the residual heats under discussion. It has surprisingly been found in the design calculations that the heat exchange surfaces of the entire $CO_2$ and/or $H_2S$ installations remain the same, and more often are reduced when using the process of the present invention. This is due to the fact that the heat yielded to the boiler feed water no longer has to be discharged to the outside by means of air-cooled apparatus (as is usual), whose duty and cost can thus be correspondingly reduced; moreover, the decrease in heat for the regeneration leads to a decrease in duty and cost of the reboiler.

(b) In the second place a drawback of the prior art has been eliminated. It was in fact not logical and convenient that use should be made of steam available at 130°–150° C. for heating the water during the degassing. This steam, because of its relatively high temperature, is best used in the regeneration column, whilst the heating of the boiler feed water can be effected by means of the said residual heat which is otherwise useless.

(c) Finally, from the technical point of view, it is to be noted that the heating of the water as in (b) must be such as to bring said water to a temperature in the vicinity of the boiling temperature in the regeneration column, in order to permit the passage of the steam from the degassing column to the regeneration column. To this end it is necessary, as is claimed in the present invention, that the abovementioned residual heats be recovered and yielded to the water gradually and in an order corresponding to their increasing temperatures. Besides, for attaining the abovementioned degree of heating, it is required—and claimed—suitably to raise the temperature and the quantity of heat contained in the regenerated solution, by regulating the pressure of the regeneration column so as to drastically reduce the amount of steam discharged to the outside at the top of the column, and recover the stripping steam by storing it in the regenerated solution. This will be better explained in the subsequent paragraph (6). This requirement proves to be of fundamental importance in many practical cases.

The aforesaid residual heats substantially consist of the heats contained in the regenerated solutions discharged from the regeneration column and in the vapours issuing at the top of the said column, and mainly, on account of its higher temperature, the heat contained in the process gas issuing from the reboiler. Other possible residual heats of installations thermally associated with those used for carrying out the process of the present invention, may also be used.

(1) The process of the present invention and its various embodiments will now be described in greater detail, with reference to FIG. 1, in which is shown the most usual device for degassing the boiler feed waters, to FIG. 2 in which are shown the various devices for purifying the condensation water obtained in the process, to FIGS. 3 and 4 where use is made of a device including an ejector and respectively of a device with a double regeneration column, and to FIGS. 5 to 8 which show four different (2 stage) configurations of the column for degassing and purifying the boiler feed waters.

Figure 1:
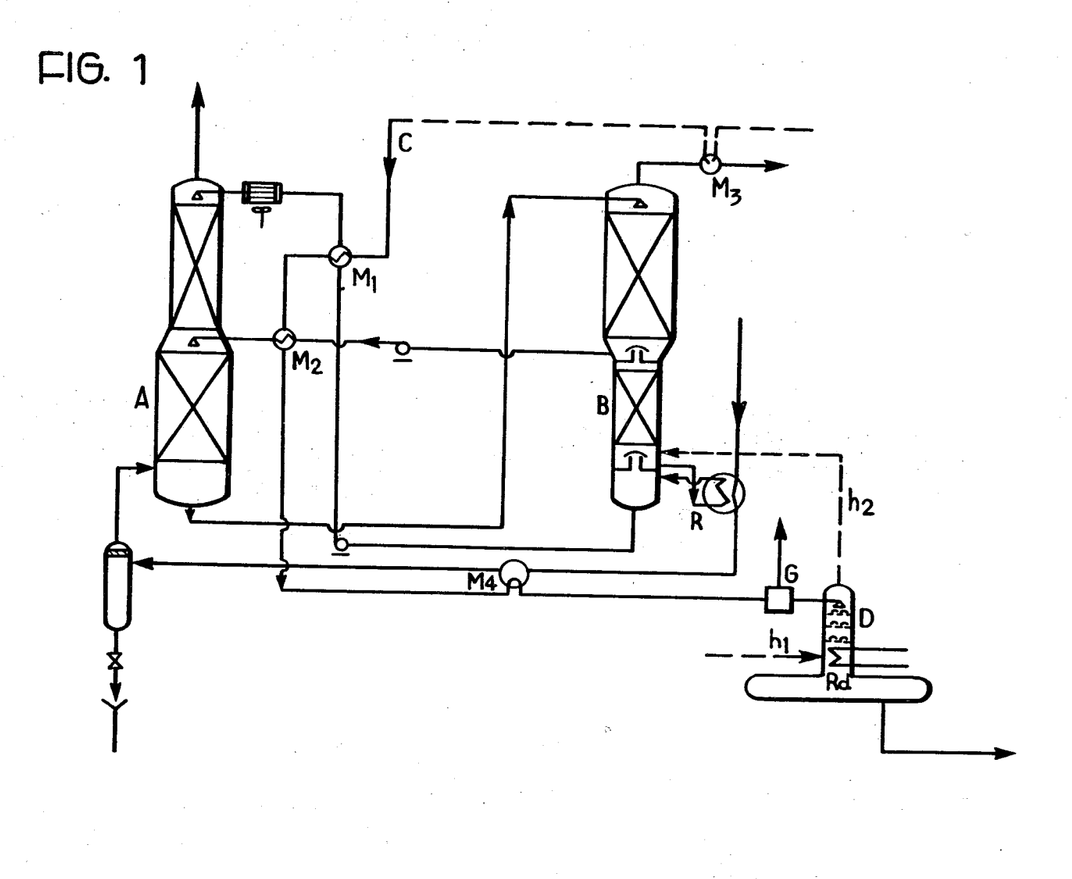

The embodiment shown in FIG. 1 refers to a conventional two-stage purifying cycle, comprising a two-stage absorption column A, a two-stage regeneration column B and a reboiler R where the heat of the process gas is released.

The process of the present invention is applied as follows:

The boiler feed water comes from the apparatus for the chemical treatment, in which the condensation waters of the process may also be treated upon thermal purification, as will be described hereinafter. The said water is circulated through pipe C and pre-heated by means of the semi-regenerated solution in the recovery device M2 and by the regenerated solution in the recovery device M1 and, possibly, previously in the recovery device M3 by means of the vapours issuing from the regeneration column. It is also possible to utilize residual heats provided from other installations by means of recovery devices not shown in the figure.

The pre-heating of the water which, as mentioned above, is carried out gradually by using the residual heats in the order of their increasing temperatures, is completed in the recovery device M4 by utilizing the heat of the process gas issuing from the reboiler R. The water is thus brought to a temperature in the vicinity of (preferably equal to) the boiling temperature of the solution in the regeneration column.

A certain amount of impurities dissolved in the thus preheated water is evolved. These impurities are discharged to the outside by means of the separator G. The water is then introduced at the top of the degassing column D (for the removal of air), which, in the embodiment of FIG. 1, operates at the pressure of the regeneration column B.

The degassing steam is introduced, at the said pressure and in amounts required for the degassing and stripping of the impurities present in the water, at the bottom of the degassing apparatus by means of pipe $h_1$, purifying the water in said degassing device. The steam flows upwardly and, being in contact with water at the same temperature, remains thermally entirely in excess. The said steam is discharged at the top of the degassing device D and is delivered by means of pipe $h_2$ to the regeneration column B where it is used again.

Figure 2:
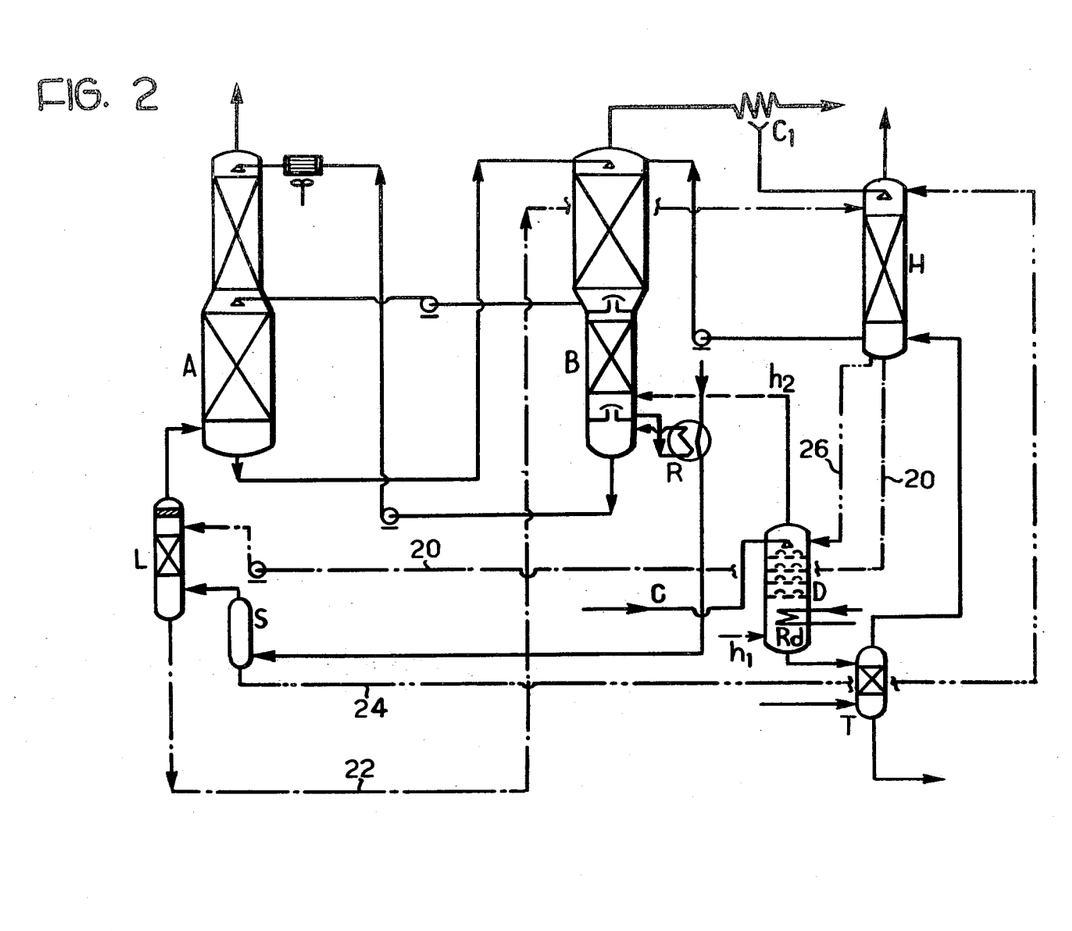

The embodiment of FIG. 2, fully similar to that of FIG. 1, corresponds to the case where the water to be purified is constituted by the condensates of the process, namely the hot condensates of the reboiler R and others and the cold condensates (final fraction) of the cooler C1 for the $CO_2$ and/or $H_2S$ issuing from the regeneration column B.

The said condensates contain impurities such as $NH_3$ (600–800 ppm), $CO_2$ (1000–2000 ppm), methanol (800–1500 ppm) and other organic compounds.

In order to make possible the re-utilization of these waters as boiler feed waters at elevated pressure (110–130 Atm.) the said impurities must be practically completely removed. To this end a very expensive treatment with about 200–250 kg steam/cu.m. of water is necessary. Moreover, the discharge to the outside of said impurities must be carried out by complying with very strict ecological standards.

According to the present invention, these drawbacks are overcome as follows:

The aforesaid condensation waters are previously pre-heated to a temperature in the vicinity of the boiling temperature of the solution at the pressure of the regeneration column B. However, this operation is facilitated by the fact that said waters are already hot (whereas the cold condensates must be heated); the said condensation waters are then delivered by means of pipe C to the purification column D which operates at a pressure at least equal to that of column B and in which said waters are treated by means of 200–250 kg steam/cu.m. of water, introduced by means of pipe $h_1$. This steam, as already stated in the case of the embodiment of FIG. 1, after being used for the purification of the waters, remains thermally entirely in excess; the said steam is discharged at the top of column D and delivered by means of pipe $h_2$ to the regeneration column B, where it is used again. In this manner the heat consumption required for the purification of the condensation waters is practically eliminated.

However, it should be noted that the steam introduced into column B contains all the impurities removed from the condensation waters; beyond certain limits, these impurities may bring about in the apparatus for the removal of $CO_2$ and/or $H_2S$ the formation of foams in the solution, the contamination of the $CO_2$ sent to the production of urea and an important pollution of the $CO_2$ discharged in the atmosphere and of the waste waters.

The above drawbacks are overcome by means of methods which are one of the most important characteristics of the present invention. These methods are based on the fact that the aforesaid impurities which accumulate in the apparatus for the removal of $CO_2$ and/or $H_2S$, are removed in amounts necessary for avoiding the attainment of concentrations detrimental to the good functioning of the apparatus for removing $CO_2$ and/or $H_2S$, and are on the contrary reduced to lower and safer values.

With reference to the embodiment of FIG. 2, it should be first noted that in the current art the condensation waters of cooler C1 for the $CO_2$ and/or $H_2S$ issuing from column B, are recycled, to restore the water balance, at the top of column B. These waters are on the contrary extracted and delivered to column H, purified by means of a treatment with a current of air or other gas specified hereinafter, and then recycled to column B. The circuit of these waters is shown in continuous lines in the figure.

The treatment is preferably carried out at elevated temperature, for example by pre-heating the air or the other gas by direct contact in column T with the waters issuing at elevated temperature from column D.

It has been found that this treatment with air on the other gases is generally sufficient for removing the major part of the impurities from the condensates, up to a final value of about 50 ppm of $NH_3$, taken as a reference impurity.

The air utilized for the said purification of the condensation waters in column H may be constituted by a small part of the combustion air used in the reforming furnace, or of the air used in the secondary reforming. As an alternative, it is also possible to use the methane utilized in said reforming, or else the purge gas obtained in the synthesis process. In this manner the impurities are completely destroyed during the reforming, thus solving any pollution problem. It is also possible to deliver the said impurities to an incineration apparatus, where these are suitably admixed with combustible substances and burnt.

A method similar to the preceding one consists in scrubbing the process gas in column L, before introducing the latter in absorber A, with a stream of water which removes part of the impurities. This water is then purified in column H, preferably at elevated temperature, by treatment with air, methanol or other gases possibly preheated, which are then delivered to the reforming apparatus as previously stated; said water is then recycled to column L by pumping. The circuit of the waters is shown by lines 20 and 22 in FIG. 2.

It is also possible to use another method which consists in previously treating in column H, with air, methanol or other gases as stated above, the waters coming from the separator S or also from the cooler for $CO_2$ and/or $H_2S$, in order to deliver to the column D waters with a lesser amount of impurities. The said air, methanol or other gas is previously heated and humidified in the column T, as previously stated. There is generally obtained a final amount of about 50 ppm of $NH_3$, taken as a reference impurity. In this manner the steam which is delivered from column D to the regeneration column B will be of very higher purity. The circuit of the waters is shown by lines 24 and 26 in FIG. 2.

A further method consists in circulating the waters and the impurities from the apparatus for removing $CO_2$ and/or $H_2S$ to the column for purifying the waters. More precisely, the steam extracted from the column for degassing and purifying the waters is directly delivered to the regeneration column for $CO_2$ and/or $H_2S$ (as live steam).

The water corresponding to this steam is extracted in the form of a condensate from the coolers for $CO_2$ and/or $H_2S$ issuing from the regeneration column. This water is delivered, with the impurities present in the same, to the purification column where said impurities are removed and divided into a major fraction, which is discharged to the outside, and a minor fraction, which accompanies the steam delivered from the column for purifying the waters to the regeneration column for $CO_2$ and/or $H_2S$.

Finally, it should be noted that the pre-regeneration of the condensation waters can be carried out not only by means of air or another gas, but also by means of steam in a two-stage column, as described in detail hereinafter at paragraph 7 and with reference to FIG. 5. It is also possible to use a mixed pre-regeneration with air and steam, as described at paragraph 8 with reference to FIG. 6.

(2) In the embodiments shown in FIGS. 1 and 2 the steam for purifying the waters may be supplied from the outside, or else produced by heating with the process gas at a suitable temperature in reboiler Rd, located in column D, or in a non-preferred embodiment in a small boiler (not shown in the Figures). In this last case, it is advantageous to introduce the process gas into the said apparatus at the maximum temperature corresponding to the outlet temperature from the CO conversion apparatus; the said process gas is then delivered to the reboiler of the regeneration column at a sufficiently low temperature, to avoid corrosion problems brought about by the use of too high temperatures.

(3) In other cases the said steam for the purification of the waters may be constituted by the steam which, sometimes, is delivered to a reboiler used in the regeneration column in addition to the reboiler utilizing the process gas. In this case the said steam may conveniently be delivered first to the degassing and/or purifying column and then used for the purification of the water; the portion remaining in thermal excess is then delivered to the regeneration column to be used again.

(4) Finally, it should be noted with reference to the embodiments of FIGS. 1 and 2, that the steam which is delivered to the regeneration column is used in the latter in a direct manner.

In other cases, however, it may be convenient, for restoring the water balance or for other similar reasons, to utilize in the regeneration column the steam delivered to the latter, by means of a suitable reboiler. In this case the purification of the waters is carried out at a pressure higher than that of the regeneration column, so that the temperature of the steam issuing from the purification column for the waters (and remaining in said column in thermal excess) be about 10° C. higher than the boiling temperature at the pressure of the regeneration column thereby permitting re-use of said steam in the latter by means of the said reboiler.

In other cases the degassing and purification of the boiler feed waters is carried out at a still higher pressure, namely a pressure sufficiently high (3–8 Atm.) to permit utilization of the steam remaining in excess after the treatment of the waters as a motive vapor in an ejector, producing by means of the latter a drop in pressure with extraction of steam from the regenerated solution issuing from the regeneration column and recycling said steam, together with the motive vapor, to the regeneration column.

Figure 3:
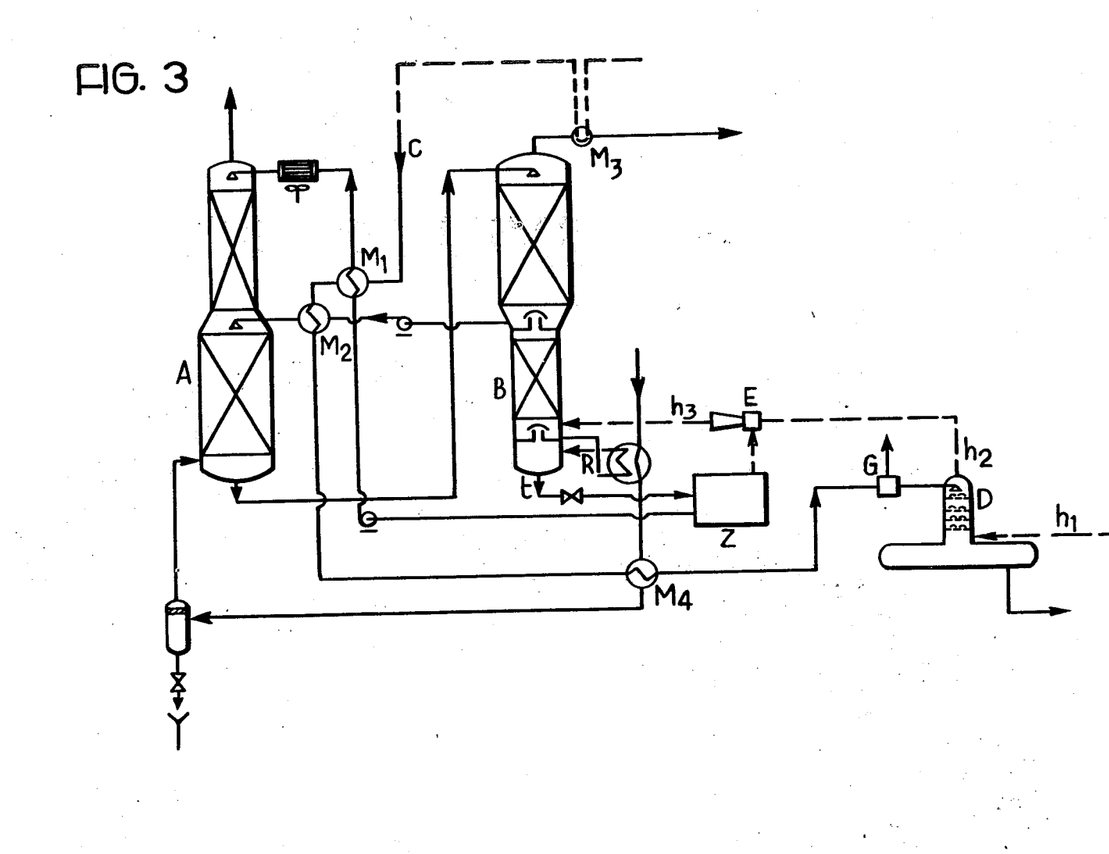

The embodiment of FIG. 3 shows one of the possible applications relating to a purifying cycle in which the absorber A and the regenerator B both have two stages; the applications for a cycle with one stage is analogous. The boiler feed water, delivered by means of pipe C, is pre-heated by means of the semi-regenerated solution in the recovery device M2 and the regenerated solution in the recovery device M1, and by means of the process gas issuing from the reboiler R in the recovery device M4 and, possibly also, previously by means of the vapors issuing from the regeneration column in the recovery device M3, in such a way as to reach a temperature in the vicinity of the boiling temperature in said regenerator B. The boiler feed water is delivered to the separator G and then to the column D where it is treated with steam delivered through pipe $h_1$; the portion of the said steam remaining thermally in excess at the top of column D is extracted by means of pipe $h_2$ and delivered to the ejector E as driving vapor in order to draw, into the chamber Z, steam from the regenerated solution (2nd stage) issued from the regenerator B through pipe t; the said steams are delivered by means of pipe h3 to the regenerator B and used therein for the regeneration. For the rest the embodiment of FIG. 3 is analogous to that of FIG. 1.

In practice with a motive steam at about 4.5 Atm. the steam extracted from the regenerated solution corresponds to a cooling of said solution of about 10°12° C., whilst the amount of the driving steam is around 1 to 1.2 times that extracted.

In both cases the supply of heat to the column D must be increased, to heat the water to a higher temperature corresponding to the higher pressure required for the steam. This may be obtained by supplying a higher amount of steam from the outside, but also, more conveniently, by means of the process gas which yields that excess of heat which is not necessary for the functioning of the installations for removing $CO_2$ and/or $H_2S$, and which is made available by heat saving obtained by means of the process of the present invention or by similar methods.

In each case the higher heating of the water sent to the boiler completely compensates said higher supply of heat or steam.

In some cases it may be more convenient to carry out the degassing and purification of the boiler feed waters by means of steam supplied from the outside, by regulating the pressure in the column so as to obtain a difference in temperature between the inlet and the outlet such that substantially all the steam supplied is consumed to afford a higher increase in temperature of the water.

(5) The process of the present invention is obviously applicable to any type of absorbent solution, as previously stated, and to any single stage or two-stage method known in the art.

It is also applicable to the so-called conventional methods in which use is made, as is known, of a heat exchanger and a cooler between the absorption column and the regeneration column. This last method is generally used in the case of ethanolamine solutions (MEA, DEA and the like) possibly containing those special corrosion inhibitors which have been discovered recently.

The process of the present invention is also applicable to the cycles in which the regeneration of the absorbent solution is carried out in two columns (arranged in series or in parallel), of which the first (main column) operates at a higher pressure and by means of heat supplied from the outside, and the other (secondary column) at a lower pressure and substantially by means of heat recovered from the regenerated solution exited from the main column.

It is possible in this case to carry out the degassing and/or purification of the waters at the pressure of the main column or at the pressure of the secondary column, and to deliver the steam exited from the degassing and/or purifying column to the first or the second regeneration column.

Methods based on the use of two regeneration columns are described for example in U.S. Pat. No. 3,962,404 and in South-African Patent No. 75/7108.

The embodiment of FIG. 4 relates to the application of the process of the present invention in the case of the regeneration method described in the above patent literature; reference is made in the following to the method in which the solution is passed in series through the two regeneration columns, but the application to the method in which the solution is passed in parallel through the two regeneration columns is obviously possible.

The absorber is a two-stage absorber. The gas is purified in said absorber preferably by means of scrubbing with an activated solution of potassium carbonate. The exhausted solution is discharged from the absorber by means of pipe 1 and delivered to the regeneration column P operating at a higher pressure. This column P is also a two-stage column; several fractions of solution having a different degree of regeneration are extracted from column P through pipe 2, through a second pipe divided in its turn into pipe 3 and pipe 4, and through pipe 5. The said fractions of solution are introduced at different levels into the secondary regeneration columns S operating at a lower pressure.

Each fraction of solution is expanded in the said column with release of steam, and the latter is used to regenerate (or better to regenerate to a higher degree) the fraction of solution introduced at a higher level. In this manner the solution, after having been regenerated in an incomplete manner in the column P, is further regenerated in the secondary column S using fundamentally the steam evolved by expansion of the various fractions of solution coming from column P. As a result, the heat supplied by means of the reboiler R located at the bottom of column P, is less (by about 30 to 40%) than that necessary in conventional methods. The reboiler R, as shown in the Figure, utilizes the heat of the process gas which leaves the reboiler at a somewhat elevated temperature (in general 130°–135° C.) due to the fact that column P operates under pressure. The said gas passes through the recovery device M3, where it heats the boiler feed water, which has been previously preheated in the recovery devices M1 and M2 by means of the heat of the regenerated solutions exited from column S, to a temperature practically equal to the boiling temperature in column P operating at a higher pressure. The thus pre-heated water is delivered by means of pipe 8 to the degassing or purifying column D, where it is treated in countercurrent with the steam introduced by means of pipe 7. The part of the steam remaining in thermal excess is then delivered by means of pipe 9 to the regeneration column P operating at a higher pressure and is used therein as stripping steam.

The solutions extracted from column S by means of pipes 10 and 11 are delivered by means of pumps P1 and P2 to the primary and the secondary stage of the absorber A.

In this embodiment the advantages of the process of the present invention are combined with those deriving from the use of a regeneration method with two pressure levels. The results are very advantageous; the regeneration heat is practically halved (that is to say 500–550 Kcal/N cu.m. of $CO_2$ in a two-stage apparatus for the removal of $CO_2$, with a potash solution activated with glycine).

(6) It has already been suggested to increase the temperature and the amount of heat contained in the regenerated solution by regulating the pressure of the regeneration column so as to create a difference in temperature between the bottom and the top of said column, in order to recover the steam, which would normally escape at the top of the column, by storage in the solution.

This temperature difference is regulated, taking also into account the amount of heat supplied by the reboiler at the bottom of the regeneration column (in other words the degree of carbonation of the solution which it is desired to obtain at the end of regeneration), in such a way that the stripping steam is not discharged to the outside in a useless excess, but is instead recovered and used for heating the solution. More particularly, the said temperature difference is regulated within the range of 10°–45° C., in such a way that the amount of steam discharged to the outside at the top of the regeneration column is 1.5–3 times in excess with respect to the amount corresponding to the equilibrium conditions. Detailed operation conditions and diagrams are given in the aforementioned Patent literature.

(7) As previously indicated, the impurities removed from the boiler feed waters and directly carried by the steam into the regeneration column B may cause, beyond certain amounts, drawbacks in the apparatus for removing $CO_2$ and/or $H_2S$. Thus, for example, oxygen may, above certain limits, react with the chemical compounds contained in the gas to be purified or in the absorbent solution, bringing about decompositions, formation of oxidation compounds and foams, corrosion and the like. The disadvantage is greater when the water to be degassed and purified is constituted by process condensates (referred to hereinbefore) which contain, in addition to $CO_2$, other impurities such as $NH_3$, methanol, HCN, amines, COS and the like.

Figure 5:
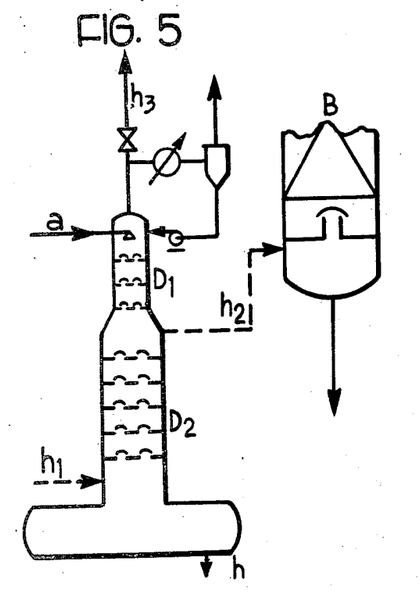

In addition to the embodiments disclosed in paragraph 1, the embodiment shown in FIG. 5 may also be used to avoid these drawbacks.

In this embodiment the column for degassing and purifying the waters is a two-stage column comprising an upper pre-purification zone D1 and a lower purification zone D2. The water to be degassed and purified is introduced by means of pipe a into the upper zone D1 and, after passage in the latter, flows through the lower zone D2, at the bottom of which said water is extracted and sent for utilization by means of pipe h. The steam for the degassing and purification of the water is introduced at the bottom of the zone D2 for the degassing and purification by means of pipe h1, flows through the said zone, and is divided at the top of said zone into two fractions; the first fraction is delivered to the regeneration column B by means of pipe h2 and used therein for the desorption; the second fraction is instead passed through the upper-purification zone D1 where it removes the major part of the gaseous impurities contained in the water, and is discharged to the outside together with said impurities by means of pipe h3. The first zone terminates at a height at which the steam contains a low amount of impurities, so that the latter can be directly delivered to the regeneration column without drawbacks. Generally, the steam is introduced at the bottom of the lower zone D2 in an amount of about 250 kg/cu.m. of water. A fraction corresponding to about 200 kg/cu.m. of water is discharged at the top of zone D2 and is delivered to the regeneration column B of the apparatus for removing $CO_2$ and/or $H_2S$, whereas the remaining fraction corresponding to 50 kg of steam/cu.m. of water is passed through the upper zone D1. In this manner, the waters are pre-regenerated in zone D1 up to a final ammonia content of 50 ppm (taken as a reference impurity). As a result, there is delivered to the regeneration column B steam containing $NH_3$ in an amount corresponding to 250 ppm with respect to water. Therefore, the content of impurities in the apparatus for removing $CO_2$ and/or $H_2S$ tends to reach the said concentration of 250 ppm of $NH_3$, this value being improved with respect to the 800–1000 ppm of $NH_3$ present in the condensates of the coolers for $CO_2$ and/or $H_2S$ in the current art.

Moreover, it should be noted that the steam issuing from zone D1 may conveniently be condensed in the reflux cooler and recycled to the column according to the known art; a suitable fraction of the condensate is discharged to the outside, conforming to the current ecological requirements.

(8) In this case also, it is preferable to deliver the said impurities to the reforming apparatus by means of a flow of gas (air or methanol or purge gas from the $NH_3$ synthesis), as hereinbefore specified.

Figures 6, 8:
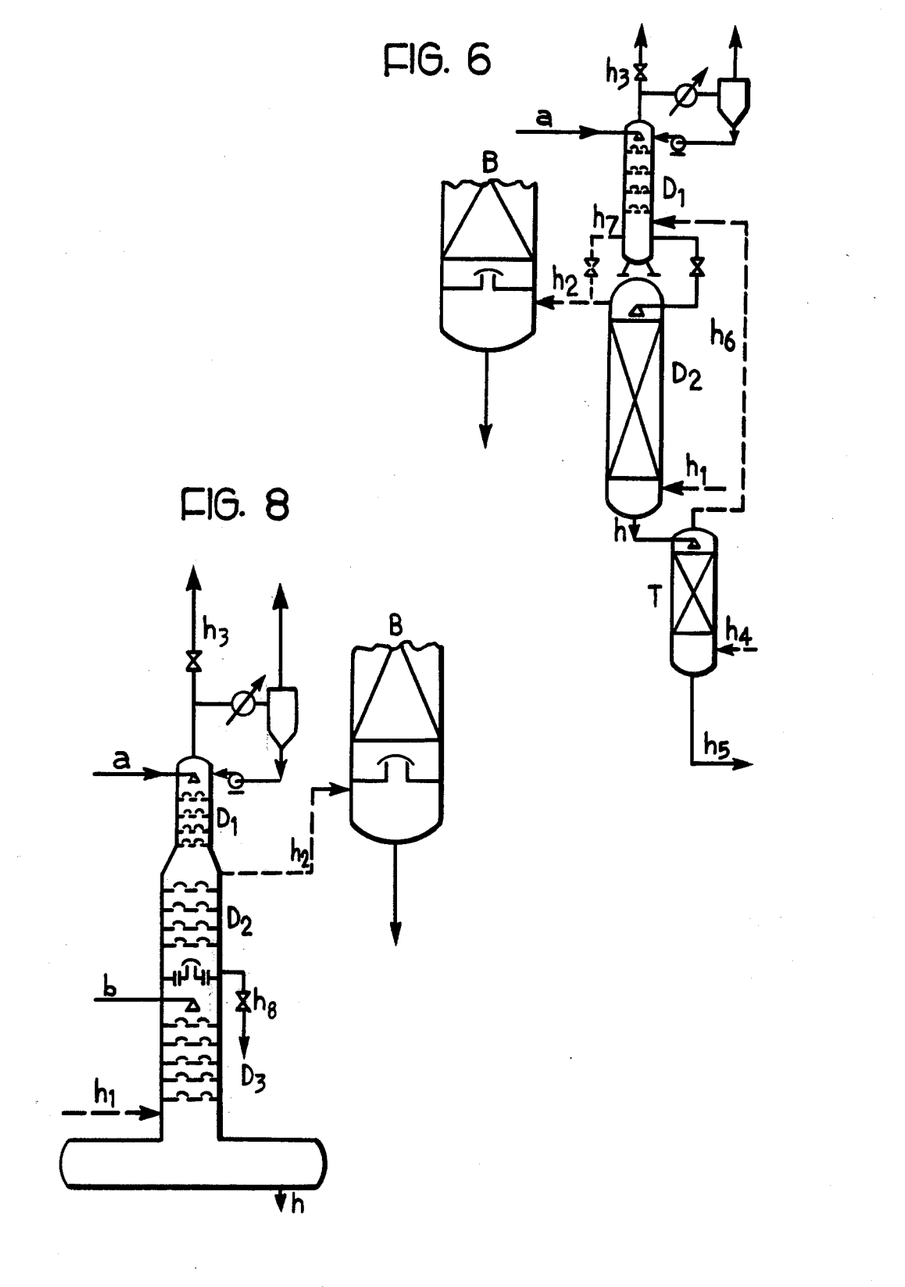

The embodiment shown in FIG. 6 is similar in functioning to that shown in FIG. 5. There are also two zones D1 and D2 and the pipes having the same function are shown by the same reference as in FIG. 5.

With respect to the embodiment of FIG. 5, a small tower T has been added. The said current of gas is introduced into tower T by means of pipe h4, and is heated and humidified by direct contact with purified hot water discharged from column D2 by means of pipe h. The said water is then discharged from tower T by means of pipe h5. The said current of gas is then delivered by means of pipe h6 to column D1, where the heat and the steam contained in said gas are added to the steam coming from column D2 through pipe h7. As a result, there is obtained a better purification in column D1 with a lesser amount of impurities delivered to column D2 and conclusively to the regeneration column of the apparatus for removing $CO_2$ and/or $H_2S$.

Figure 7:
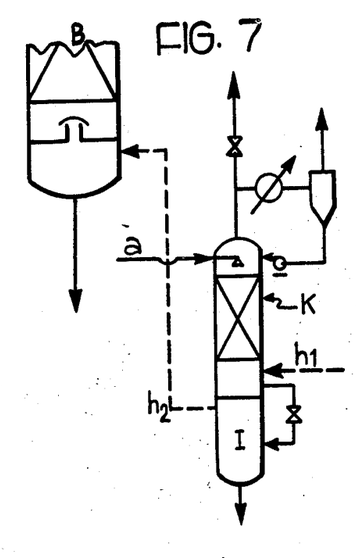

(9) A purification column with two zones at different pressure levels is shown in FIG. 7.

This column is operated at high pressure (higher than 4 atm.). For example, it is possible to utilize steam at the pressure (about 34 atm.) which is used in the reforming apparatus.

This steam is introduced at the bottom of the upper zone K, by means of pipe h1, in the usual amount of 200–250 kg/cu.m. of water, thus purifying the condensate introduced at the top of said upper zone K by means of pipe a. During the passage through the column, a great part of the steam is consumed to heat said water to the temperature of 235°–240° C., whereas the excess of steam is condensed in the reflux cooler, as is known to those skilled in the art.

The purified water heated to 235°–24° C., is extracted from the upper zone K and expanded in the lower zone I in which the pressure is about equal to that of the regeneration column, this feature being a characteristic of this embodiment.

By expansion, for example to about 122° C., the water yields 220 kg of steam/cu.m. of water. This steam is very pure. As a result, the introduction of said steam into the regeneration column of the apparatus for removing $CO_2$ and/or $H_2S$, by means of pipe h2, does not lead to any drawback.

(10) The process of the present invention is obviously also applicable to the case where the degassing and the purification are carried out on two or more different types of water, that is of different nature and origin, such as, for example, the aforesaid condensation water of the process gas (containing $NH_3$, HCN, methanol, amines, COS and the like) and the water which has been submitted to the usual chemical treatment for the boiler feed waters, which are degassed, as is usual, to remove impurities such as oxygen and $CO_2$. In the industrial practice both types of water are purified and degassed for subsequent utilization, for example as boiler feed water.

The easier manner of applying the process of the present invention consists in treating the two types of water separately in two devices (columns) of degassing and purification, each being fed with the necessary amount of steam which is then delivered at the end of the operation to the regeneration column. Each of said columns may possibly be a two-stage column as hereinbefore described.

According to a more convenient embodiment, the steam is first introduced into the first device (or column) for degassing and purification, and then delivered in series, entirely or in part, to the subsequent device.

More precisely, according to this embodiment the two aforesaid devices for the degassing and purification are arranged in such a way that each is traversed by the corresponding water to be purified, with the exception, however, that the steam is supplied to only one of the two devices and, after having been used in the latter, is then delivered to the second one and used therein. Said steam is then discharged to the outside, or delivered to the regeneration column. In this manner the amount of degassing heat supplied from the outside is reduced.

One of the devices suitable for the purpose is shown in FIG. 8.

The purification column comprises three zones, D1, D2 and D3. The first water to be purified (generally the condensation water of the process) is introduced, possibly upon pre-heating, by means of pipe a, flows through the zones D1 and D2 and is then discharged from this latter by means of pipe h8 and delivered to the apparatus for the chemical treatment where its purification is completed (in some cases, however, it may also be passed through zone D3 and be combined with the water introduced via pipe b.

The second water (generally the chemically treated water for the feeding of the boiler) is introduced by means of pipe b, upon suitable pre-heating as previously stated, at the top of zone D3 and is discharged at the bottom by means of pipe h. The steam is introduced by means of pipe h1, flows through zone D3 and then through zone D2, at the top of which it is divided into two fractions; in the same manner as in the embodiment of FIG. 5, the first fraction is delivered by means of pipe h2 to the regeneration column B; the second fraction flows through zone D1, where it removes the major part of the impurities present in the water introduced via pipe a and is discharged to the outside together with the removed impurities by means of pipe h3.

In this embodiment the steam is advantageously utilized three times in series, namely a first time for the water introduced via pipe b (usually the boiler feed water), a second time for the water introduced via pipe a (condensation water of the process) and a third time in the regeneration column.

EXAMPLE 1

The process of the invention is applied to an installation for the removal of $CO_2$ in a plant producing 1000 metric tons per day of ammonia from methane, that is 152,500 N cu.m/h. of gas containing 18% of $CO_2$, at a pressure of 28 atm. A purification down to a content of 0.1% of $CO_2$ and the recovery of all the $CO_2$ (27,325 N cu.m/hour) at a pressure of 2 atm. are required.

By using a solution of potassium carbonate activated with glycine (250 g/l of $K_2O$; 50 g/l of glycine), in a conventional two-stage installation, the results are as follows:

heat consumption in the reboiler: $27.5 \cdot 10^3$ Kcal/hour, corresponding to 1000 Kcal/N cu.m. of $CO_2$;
 Temperature of the regenerated solution: 125° C.; temperature of the semi-regenerated solution: 121° C.; temperature of the solution issuing from the absorber: 108° C.;
 temperature of the gas issuing from the reboiler: 135° C.;
 boiler feed water: 200 cu.m/hour. This water is heated to 85° C. by using the heat of the two regenerated solutions; the pressure in the boiler is 100 atm.;
 steam supplied to the degassing column: about $6 \cdot 10^3$ Kcal/hour, corresponding to a heating of the boiler water from 85° C. to 115° C.

By applying the process of the present invention, the boiler feed water is further pre-heated to 121° C. (that is the boiling temperature at the pressure of the regeneration column) by means of the heat ($7.5 \cdot 10^3$ Kcal/hour) that the process gas yields in the recovery device M4 of FIG. 1, cooling down to about 106° C.

The heat previously yielded in the degassing apparatus ($6 \cdot 10^3$ Kcal/hour) is delivered by means of pipe h2 to the regeneration column B in which, therefore, the heat supplied from the reboiler R will be reduced to $27.7 - 6 = 21.5 \cdot 10^3$ Kcal/hour, corresponding to 780 Kcal/N cu.m. of $CO_2$.

Moreover, there is a further heat saving due to the fact that the water, upon degassing, is at 121° C. instead of 115° C. in the conventional method.

EXAMPLE 2

The production plant is the same as in Example 1. Instead of a conventional two-stage apparatus, use is made of a two-stage apparatus in which the regeneration step is carried out in two regeneration columns, operating respectively at a higher pressure (1.8 atm) and at a lower pressure (about atmospheric), according to the teaching of the aforementioned patent literature.

The heat consumption in the said cycle is $20.2 \cdot 10^3$ Kcal/hour, corresponding to 730 Kcal/N cu.m. of $CO_2$.

Figure 4:
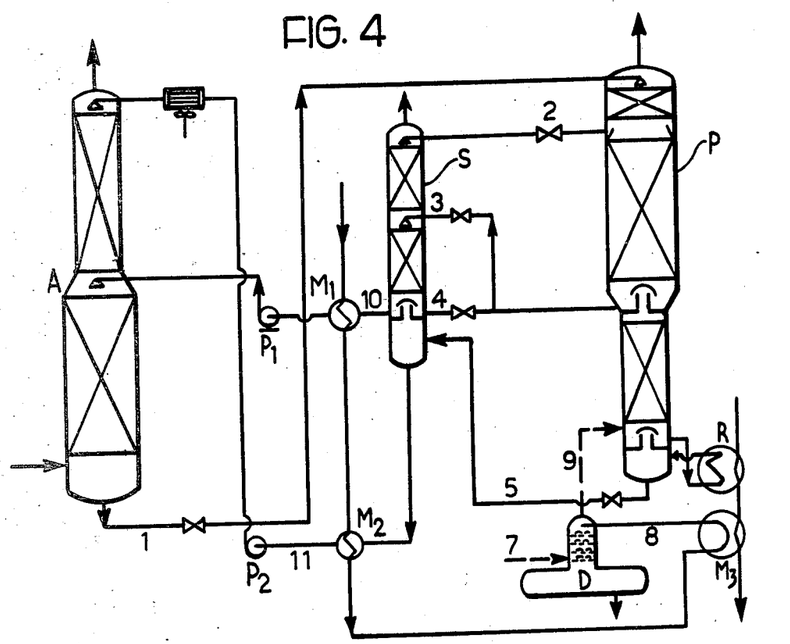

By applying the process of the present invention, as in Example 1 and according to the embodiment of FIG. 4, the degassing steam ($6 \cdot 10^3$ Kcal/hour) is recycled to the regeneration column at higher pressure; as a result, the heat supply by means of the reboiler drops to $20.2 - 6 = 14.2 \cdot 10^3$ Kcal/hour, corresponding to 515 Kcal/N cu.m. of $CO_2$.

A further advantage stems from the fact that the water, upon degassing, is at 121° C. instead of 115° C. in the prior art.

EXAMPLE 3

The installation is the same as in Example 1, except for the fact that the heat supplied for the regeneration ($27.5 \cdot 10^3$ Kcal/hour) is obtained in an amount of $21.5 \cdot 10^3$ Kcal/hour by passage of the process gas through the reboiler, and the remaining part ($6 \cdot 10^3$ Kcal/hour) from steam of a different origin (said part being usually obtained in the known art from a suitable reboiler).

By applying the process of the present invention, said steam ($6 \cdot 10^3$ Kcal/hour) is first delivered to the degassing apparatus and contacted with the boiler feed water which is already pre-heated to 121° C. (that is the temperature corresponding to the pressure of the regeneration column); this system is then extracted practically in its entirety at the top of the degassing apparatus and delivered to the regeneration column. The steam supplied to the degassing apparatus in the known art is thus saved, whilst the water is still heated to 121° C.

EXAMPLE 4

The installations of Example 1 produced about 40 cu.m/hour of condensation water, which it is desired to recover for use as boiler feed water. This water contains impurities, mainly 600–800 ppm of $NH_3$, 1000–2000 ppm of $CO_2$, 800–1500 ppm of methanol and other organic compounds.

Using the embodiment shown in FIG. 2, this condensation water is delivered from the separator S to the column H, where it is regenerated by means of air which has been previously humidified in column T. In the latter, the condensation water coming from column D is cooled by about 25° C., the air taking over 1850 kg/h of steam.

This steam is delivered to column H, in which the water is regenerated up to a final content of 100 ppm of $NH_3$, taken as a reference impurity.

The thus pre-regenerated water is delivered to the column D, where its regeneration is completed by means of 10,000 kg/hour of steam, which are introduced by means of pipe h1. The circuit of the water is that shown by lines 24 and 26 in FIG. 2.

This steam, after its utilization, escapes from the column D in an amount still equal to about 10,000 kg/hour and is delivered to the regeneration column B by means of pipe h2; the steam supplied from the outside to the said regeneration column by means of the reboiler is thus reduced by 10,000 kg/hour.

The air used for carrying the said steam from the column T to the column H, supposing that said air is saturated, is about 650 N cu.m/hour, this air being then delivered to the secondary reforming apparatus (which corresponds to about 1.5% of the air delivered to the secondary reforming apparatus).

EXAMPLE 5

In an apparatus for the removal of $CO_2$, connected as in the preceding Examples to installations for the reforming and the conversion of CO, the column for the treatment of the boiler feed water is constituted by three zones, D1, D2 and D3, as shown in FIG. 8. The lower zone D3 is fed with 55 cu.m/hour of boiler feed water which are degassed, with removal of $CO_2$ and oxygen, by means of 4,000 kg/hour of steam. This steam, at the outlet of the first zone, is delivered to the second zone D2, in which it is used to purify 13 metric tons per hour of condensation water of the process gas, removing from said water $NH_3$, methanol and other organic compounds. The steam is then divided into two fractions. The first one, corresponding to 3,500 kg/hour, is delivered to the regeneration column of the apparatus for removing $CO_2$; the second fraction, corresponding to 500 kg/hour, is used in the third zone D1 of the column, as shown in FIG. 8, to remove the bulk of the impurities present in the condensation water and discharge the impurities thus removed to the outside.

It will be noted that the condensation water is treated in zone D2 with $4,000/13 = 300$ kg/ of steam/cu.m. of water, that is with an amount of steam necessary for a complete removal of the impurities, the purity grade being sufficient to permit a safe use even in boilers operating at very high pressure.

We claim:

1. In a process for removing gaseous impurities, such as $CO_2$ and/or $H_2S$ and the like from a gaseous mixture obtained by a gasification method in which combustible substances are reacted at elevated temperature with steam, comprising an absorption step in which said gaseous mixture is brought into contact in an absorption column with an aqueous alkaline absorbent solution, and a regeneration step in which said impurities are removed from the absorbent solution in a regeneration column by stripping with steam obtained mainly from a reboiler in which heat is recovered from the gaseous mixture to be purified by indirect heat exchange in the reboiler with the aqueous alkaline absorbent solution, and wherein the steam utilized in said gasification methods is produced in boilers fed with boiler feed water previously degassed and purified by a treatment with steam in suitable means, the improvement which comprises:

delivering said steam, at a pressure at least equal to that in said regeneration column, first to said degassing and purification columns and then to said regeneration column to be used again, wherein after said steam is used for degassing and purifying in said means said steam is delivered, at a pressure at least equal to the pressure in said regeneration column, to said regeneration column, said steam yielding heat initially to said boiler feed water in said degassing and purification means and then to the absorbent solution in the regeneration column.

2. The process of claim 1, in which said degassing and purification means operates at the same pressure and temperature as in said regeneration column.

3. The process of claim 1, in which said degassing and purification means operates at a pressure higher than that in said regeneration column, so that the steam extracted from said degassing and purification means is used in a reboiler located at the bottom of said regeneration column.

4. The process of claim 1, in which said degassing and purification means operates at a pressure higher than that in said regeneration column, so that the steam extracted from said degassing and purification means is used as motive steam in an ejector to create a drop in pressure and extract steam from the regenerated solution issuing from said regeneration column, said extracted steam being delivered, together with said motive steam, to said regeneration column.

5. In a process for removing gaseous impurities, such as $CO_2$ and/or $H_2S$ and the like, from a gaseous mixture obtained by a gasification method in which combustible substances are reacted at elevated temperature with steam, comprising an absorption step in which said gaseous mixture is brought into contact in an absorbent column with an aqueous alkaline absorbent solution, and a regeneration step in which said impurities are removed from the absorbent solution in a regeneration column by stripping with steam obtained mainly from a reboiler in which heat is recovered from the gaseous mixture to be purified by indirect heat exchange in the reboiler with the aqueous alkaline absorbent solution, and wherein the steam utilized in the said gasification method is produced in boilers fed with boiler feed water previously degassed and purified by treatment with steam in suitable means, the improvement which comprises:
  (a) recovering the residual heats of the regenerated solution issuing from said regeneration column and that of the gaseous mixture to be purified issuing from said reboiler, and using said residual heats to gradually heat said boiler feed waters to a temperature in the vicinity of the boiling temperature of the solution in said regeneration column;
  (b) delivering said boiler feed water pre-heated in (a) to said degassing and purification means;
  (c) extracting the steam remaining in thermal excess from said degassing and purification means and delivering said steam to the regeneration column, wherein after said steam is used for degassing and purifying in said means, said steam is delivered, at a pressure at least equal to the pressure in said regeneration column, to said regeneration column, said steam yielding heat initially to said boiler feed water in said degassing and purification means and then to the absorbent solution in the regeneration column.

6. The process of claim 5, in which the amount and the temperature of the residual heat of the regenerated solution issuing from said regeneration column are increased by increasing the pressure in said regeneration column, to an extent such as to create a temperature difference of from 10° to 35° C. between the bottom and the top of said regeneration column according to the degree of regeneration of the solution issuing from the said regeneration column.

7. The process of claim 5, in which said degassing and purification means operates at the same pressure and temperature as the regeneration column.

8. The process of claim 5, in which said degassing and purification means operates at a higher pressure than that in said regeneration column, so that steam is extracted from said degassing and purification means and used in a suitable reboiler located at the bottom of said regeneration column.

9. The process of claim 5, in which said degassing and purification means operates at a higher pressure than that in said regeneration column, so that steam is extracted from the said degassing and purification means and used as motive steam in an ejector, to create a drop in pressure and extract steam from the regenerated solution issuing from said regeneration column, said extracted steam being delivered, together with said motive steam, to said regeneration column.

10. In a process for removing gaseous impurities, such as $CO_2$ and/or $H_2S$ and the like, from a gaseous mixture obtained by a gasification method in which combustible substances are reacted at elevated temperature with steam, comprising an absorption step in which said gaseous mixture is brought into contact in an absorption column with an aqueous alkaline absorbent solution, and a regeneration step in which said impurities are removed from the absorbent solution in a regeneration column by stripping with steam obtained mainly from a reboiler in which heat is recovered from the gaseous mixture to be purified by indirect heat exchange in the reboiler with the aqueous alkaline absorbent solution, and wherein the steam utilized in said gasification method is produced in boilers fed with boiler feed water previously degassed and purified by treatment with steam in suitable means, the improvement which comprises:
  (a) delivering steam, at a pressure at least equal to that in said regeneration column, first to said degassing and purification means and then, together with the impurities removed from said boiler feed waters, to said regeneration column to be used again, said steam thus yielding heat to said boiler feed water in said degassing and purification means and then to the absorbent solution in the regeneration column;
  (b) extracting from the apparatus for removing $CO_2$ and/or $H_2S$ a part of the condensation waters of the coolers for $CO_2$ and/or $H_2S$ issuing at the top of said regeneration column, delivering said condensation water to a column in which a part of the impurities present in said condensation water is removed by stripping with inert gas, and then recycling a part of said condensation water to the apparatus for removing $CO_2$ and/or $H_2S$.

11. The process of claim 10, in which said inert gas is constituted by a part of the gas to be delivered to the apparatus for conducting said gasification method and is delivered to said apparatus for conducting said gasification method together with the impurities removed from said condensation water, said impurities being destroyed in said apparatus for conducting said gasification method.

12. The process of claim 10, in which said inert gas, prior to its utilization for stripping said condensation water, is previously heated and humidified (by addition of steam) by bringing it into direct contact with the boiler feed water issuing from said degassing and purification means.

13. In a process for removing gaseous impurities such as $CO_2$ and/or $H_2S$ and the like, from a gaseous mixture obtained by a gasification method in which combustible substances are reacted at elevated temperature with steam, comprising an absorption step in which said gaseous mixture is brought into contact in an absorption column with an aqueous alkaline absorbent solution, and a regeneration step in which said impurities are removed from the absorbent solution in a regeneration column by stripping with steam obtained mainly from a reboiler in which heat is yielded by the gaseous mixture to be purified, and wherein the steam utilized in said gasification method is produced in boilers fed with boiler feed water previously degassed and purified by treatment with steam in suitable columns, the improvement which comprises:

(a) delivering steam, at a pressure at least equal to that in said regeneration column, first to said degassing and purification means and then, together with the impurities removed from said boiler feed water, to said regeneration column to be used again, said steam thus yielding heat to said boiler feed water in said degassing and purification means and then to the absorbent solution in the regeneration column;

(b) scrubbing the gaseous mixture to be purified, prior to its introduction into the absorption column, with water in a scrubbing column, to remove by means of said water a part of the impurities present in said gaseous mixture to be purified, treating in another column said water with inert gas to remove a part of the impurities present in said water, and recycling said water to the scrubbing column.

14. The process of claim 13, in which said inert gas is constituted by a part of the gas to be delivered to the apparatus for conducting said gasification method, said inert gas being delivered to said apparatus for conducting said gasification method together with said impurities removed from said scrubbing water, and said impurities being destroyed in said apparatus for conducting said gasification method.

15. The process of claim 13, in which said inert gas, prior to its utilization for the stripping of said scrubbing water, is previously heated and humidified (by addition of steam) by bringing it into direct contact with the boiler feed water issuing from said degassing and purification means.

16. In a process for removing gaseous impurities, such as $CO_2$ and/or $H_2S$ and the like, from a gaseous mixture obtained by a gasification method in which combustible substances are reacted at elevated temperature with steam, comprising an absorption step in which said gaseous mixture is brought into contact in an absorption column with an aqueous alkaline absorbent solution, and a regeneration step in which said impurities are removed from the absorbent solution in a regeneration column by stripping with steam obtained mainly from a reboiler in which heat is recovered from the gaseous mixture to be purified by indirect heat exchange in the reboiler with the aqueous alkaline absorbent solution, and wherein the steam utilized in said gasification method is produced in boilers fed with boiler feed water previously degassed and purified by treatment in suitable columns, the improvement which comprises:

(a) carrying out a pre-degassing and pre-purification of said boiler feed water in a first degassing and purification column in which said boiler feed water is treated by means of an inert gas which removes the major part of the impurities present in said boiler feed water, said removed impurities being discharged to the outside;

(b) completing the degassing and purification of said boiler feed water in a second degassing and purification column by stripping with steam, and then delivering said stripping steam, together with the impurities removed by the latter, to said regeneration column, said stripping stream thus yielding heat to said boiler feed water in said second degassing and purification column and then to the absorbent solution in the regeneration column.

17. The process of claim 16, in which said inert gas is constituted by a part of the gas to be delivered to the apparatus for conducting said gasification method, said inert gas being delivered to said apparatus for conducting said gasification method together with the impurities removed from said boiler feed water, and said impurities being destroyed in said apparatus for conducting said gasification method.

18. The process of claim 16, in which said inert gas, prior to its utilization for the stripping of said boiler feed water, is previously heated and humidified (by addition of steam) by bringing it into direct contact with the boiler feed water issuing from said degassing and purification columns.

19. In a process for removing gaseous impurities, such as $CO_2$ and/or $H_2S$ and the like, from a gaseous mixture obtained by a gasification method in which combustible substances are reacted at elevated temperature with steam, comprising an absorption step in which said gaseous mixture is brought into contact in an absorption column with an aqueous alkaline absorbent solution, and a regeneration step in which said impurities are removed from the absorbent solution in a regeneration column by stripping with steam obtained mainly from a reboiler in which heat is recovered from the gaseous mixture to be purified by indirect heat exchange in the reboiler with the aqueous alkaline absorbent solution, and wherein the steam utilized in said gasification method is produced in a boiler fed with boiler feed water previously degassed and purified by treatment with steam in suitable columns, the improvement which comprises:

(a) carrying out the degassing and purification of said boiler feed water in a two-stage column, comprising an upper zone and a lower zone, said boiler feed water being introduced into said upper zone and passed in sequence through said upper zone and then through said lower zone;

(b) delivering steam to the bottom of said lower zone, and dividing said steam, at the top of said lower zone, into a major, first fraction and a minor, second fraction; delivering said first fraction, together with the impurities removed in said lower zone, to the regeneration column; flowing said second fraction through said upper zone to remove in the latter the major part of the impurities present in said boiler feed water, and discharging to the outside said impurities removed in said upper zone together with said second fraction of steam.

20. In a process for removing gaseous impurities such as $CO_2$ and/or $H_2S$ and the like, from a gaseous mixture obtained by a gasification method, in which combustible substances are reacted at elevated temperature with steam, comprising an absorption step in which said gaseous mixture is brought into contact in an absorption column with an aqueous alkaline absorbent solution, and a regeneration step in which said impurities are removed from the absorbent solution in a regeneration column by stripping with steam obtained mainly from a reboiler in which heat is recovered from the gaseous mixture to be purified by indirect heat exchange in the reboiler with the aqueous alkaline absorbent solution, and wherein the steam utilized in said degasification methods is produced in boilers fed with boiler feed water previously degassed and purified by treatment with steam in suitable columns, the improvement which comprises:
(a) carrying out the degassing and purification of said boiler feed water in a two-stage column, comprising an upper zone and a lower zone, said boiler feed water being introduced into said upper zone and passed in sequence through said upper zone and then through said lower zone;
(b) delivering steam to the bottom of said lower zone, and dividing said steam, at the top of said lower zone, into a major, first fraction and a minor, second fraction; delivering said first fraction to the regeneration column together with the impurities removed in said lower zone; flowing said second fraction through said upper zone and removing in the latter the major part of the impurities present in said boiler feed water, and discharging to the outside the impurities removed in said upper zone, together with said second fraction of steam;
(c) extracting from the apparatus for the removal of $CO_2$ and/or $H_2S$ a part of the condensation water of the coolers for $CO_2$ and/or $H_2S$ issuing at the top of said regeneration column, delivering said condensation water to a column in which a part of the impurities present in said condensation water is stripped off by means of inert gas, and then recycling a part of said condensation water to the apparatus for removing $CO_2$ and/or $H_2S$.

21. The process of claim 20, in which said inert gas is constituted by a part of the gas to be used in the apparatus for conducting said gasification method, said inert gas being delivered to said apparatus for conducting said gasification method together with the impurities removed from said condensation water, and said impurities being destroyed in said apparatus for conducting said gasification method.

22. The process of claim 20, in which said inert gas, prior to its utilization for the stripping of said condensation water is previously heated and humidified (by addition of steam) by bringing it into direct contact with the boiler feed water issuing from said degassing and purification column.

23. In a process for removing gaseous impurities such as $CO_2$ and/or $H_2S$ and the like, from a gaseous mixture obtained by a gasification method in which combustible substances are reacted at elevated temperature with steam, comprising an absorption step in which said gaseous mixture is brought into contact in an absorption column with an aqueous alkaline absorbent solution, and a regeneration step in which said impurities are removed from the absorbent solution in a regeneration column by stripping with steam obtained mainly from a reboiler in which heat is recovered from the gaseous mixture to be purified by indirect heat exchange in the reboiler with the aqueous alkaline absorbent solution, and wherein the steam utilized in said gasification method is produced in boilers fed with boiler feed water previously degassed and purified by treatment with steam in suitable columns, the improvement which comprises:
(a) carrying out the degassing and purification of said boiler feed water in a two-stage column, comprising an upper zone and a lower zone, said boiler feed water being introduced into said upper zone and passed in sequence through said upper zone and then through said lower zone;
(b) delivering steam to the bottom of said lower zone and dividing said steam, at the top of said lower zone, into a major, first fraction and a minor, second fraction; delivering said first fraction to said regeneration column together with the impurities removed in said lower zone; flowing said second fraction through said upper zone, removing in the latter the major part of the impurities contained in said boiler feed water, and discharging to the outside the impurities removed in said upper zone, together with said second fraction of steam;
(c) scrubbing the gaseous mixture to be purified, prior to its introduction into said adsorption column, with water in a scrubbing column, removing with said water a part of the impurities contained in said gaseous mixture to be purified, treating in another column said water by means of inert gas to remove a part of the impurities present in said water, and recycling said water to the scrubbing column.

24. The process of claim 23, in which said inert gas is constituted by a part of the gas to be delivered to the apparatus for conducting said gasification method, said inert gas being delivered to said apparatus for conducting said gasification method together with the impurities removed from said scrubbing water, and said impurities being destroyed in said apparatus for conducting said gasification method.

25. The process of claim 23, in which said inert gas, prior to its utilization for the stripping of the scrubbing water, is previously heated and humified (by addition of steam), by bringing it into direct contact with the boiler feed water issuing from the said degassing and purification column.

26. In a process for removing gaseous impurities such as $CO_2$ and/or $H_2S$ and the like, from a gaseous mixture obtained by a gasification method in which combustible substances are reacted at elevated temperature with steam, comprising an absorption step in which said gaseous mixture is brought into contact in an absorption column with an aqueous alkaline absorbent solution, and a regeneration step in which said impurities are removed from the absorbent solution in a regeneration column by stripping with steam obtained mainly from a reboiler in which heat is recovered from the gaseous mixture to be purified by indirect heat exchange in the reboiler with the aqueous alkaline absorbent solution, and wherein the steam utilized in said gasification method is produced in boilers fed with boiler feed water previously degassed and purified by treatment with steam in suitable columns, the improvement which comprises:
(a) carrying out the degassing and purification of said boiler feed water in a column comprising an upper zone operating at a higher pressure and a lower zone operating at a lower pressure, said boiler feed water being introduced into said upper zone and passed in sequence through said upper zone and then through said lower zone;
(b) delivering steam to the bottom of said upper zone and, after its utilization in the latter as stripping steam, substantially condensing said steam for heating said boiler feed water; and discharging to the outside the impurities removed from the boiler feed water in said upper zone;
(c) delivering said boiler feed water purified and heated in said upper zone, to said lower zone operating at a pressure lower than that of the upper zone and at least equal to the pressure in said regeneration column, and expanding therein said boiler feed water, with release of steam;

(d) delivering the steam evolved in said lower zone to said regeneration column to use it a second time.

27. The process of claim 26, in which said lower zone operates at a pressure higher than that in said regeneration column, so that the steam extracted from said lower zone is used in a suitable reboiler located at the bottom of said regeneration column.

28. In a process for removing gaseous impurities, such as $CO_2$ and/or $H_2S$ and the like, from a gaseous mixture obtained by a gasification method in which combustible substances are reacted at elevated temperature with steam, comprising an absorption step in which said gaseous mixture is brought into contact in an absorption column with an aqueous alkaline absorbent solution, and a regeneration step in which said impurities are removed from the absorbent solution in a regeneration column by stripping with steam obtained mainly from a reboiler in which heat is recovered from the gaseous mixture to be purified by indirect heat exchange in the reboiler with the aqueous alkaline absorbent solution, and wherein the steam utilized in said gasification method is produced in boilers fed with boiler feed water previously degassed and purified by treatment with steam in suitable columns, the improvement which comprises:

(a) utilizing for the regeneration step a main regeneration column, operating at a higher pressure and with supply of heat from the outside, and a secondary regeneration column operating at a lower pressure and by means of the heat recovered from the regenerated solution issued from said main regeneration column;

(b) delivering steam, at a pressure at least equal to that in said main regeneration column, said steam thus yielding heat to said boiler feed water in the degassing and purification columns and then to the absorbent solution in the main regeneration column.

29. In a process for removing gaseous impurities, such as $CO_2$ and/or $H_2S$ and the like, from a gaseous mixture obtained by a gasification method in which combustible substances are reacted at elevated temperature with steam, comprising an absorption step in which said gaseous mixture is brought into contact in an absorption column with an aqueous alkaline absorbent solution, and a regeneration step in which said impurities are removed from the absorbent solution in a regeneration column by stripping with steam obtained mainly from a reboiler in which heat is recovered from the gaseous mixture to be purified by indirect heat exchange in the reboiler with the aqueous alkaline absorbent solution, and wherein the steam utilized in said gasification method is produced in boilers fed with boiler feed water previously degassed and purified by treatment with steam in suitable columns, the improvement which comprises:

(a) utilizing for the regeneration step a main regeneration column, operating at a higher pressure and by means of heat supplied from the outside, and a secondary regeneration column operating at a lower pressure and by means of heat recovered from the regenerated solution issued from said main regeneration column;

(b) delivering steam at a pressure at least equal to that in said secondary regeneration column, first to said degassing and purification columns for said boiler feed water, and then to said secondary regeneration column, said steam thus yielding heat to said boiler feed water in the degassing and purification columns and then to the absorbent solution in the secondary regeneration column.

* * * * *